(12) United States Patent
Matsubara et al.

(10) Patent No.: US 7,173,395 B2
(45) Date of Patent: Feb. 6, 2007

(54) INVERTER UNIT GROUNDING METHOD AND INVERTER UNIT

(75) Inventors: Shunsuke Matsubara, Yamanashi (JP); Shinichi Kono, Yamanashi (JP); Shinichi Horikoshi, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 10/765,879

(22) Filed: Jan. 29, 2004

(65) Prior Publication Data
US 2004/0183499 A1    Sep. 23, 2004

(30) Foreign Application Priority Data
Feb. 12, 2003    (JP)    ............... 2003-033618

(51) Int. Cl.
*H02P 7/74*    (2006.01)
*H02P 5/06*    (2006.01)

(52) U.S. Cl. .................. 318/803; 318/434; 318/443; 318/444; 318/85; 388/804

(58) Field of Classification Search ........... 318/802, 318/810, 700–799, 85, 434, 443, 444; 361/45, 361/47, 48, 42, 118; 324/691; 307/64; 440/6; 388/804
See application file for complete search history.

(56) References Cited

U.S. PATENT DOCUMENTS

| | | | | |
|---|---|---|---|---|
| 3,829,845 A | * | 8/1974 | Means ...................... 700/72 |
| 3,916,685 A | * | 11/1975 | Paap et al. ............. 340/855.4 |
| 4,031,437 A | * | 6/1977 | Dempsey et al. ............ 318/39 |
| 4,121,154 A | | 10/1978 | Keating .................... 324/126 |
| 4,228,475 A | * | 10/1980 | Sherwood .................. 361/47 |
| 4,321,643 A | * | 3/1982 | Vernier ..................... 361/48 |
| 4,706,048 A | * | 11/1987 | Atalar ...................... 333/32 |
| 5,008,894 A | * | 4/1991 | Laakmann ................... 372/81 |
| 5,057,965 A | * | 10/1991 | Wilson .................... 361/212 |
| 5,318,027 A | * | 6/1994 | Fukui ...................... 600/437 |
| 5,334,183 A | * | 8/1994 | Wuchinich ................. 606/46 |
| 5,427,645 A | * | 6/1995 | Lovin ..................... 156/367 |
| 5,448,337 A | * | 9/1995 | Williams .................. 399/31 |
| 5,539,323 A | * | 7/1996 | Davis, Jr. ................ 324/690 |
| 5,838,877 A | * | 11/1998 | Elliot et al. ............. 388/804 |
| 5,857,060 A | * | 1/1999 | Elliott et al. ............ 388/804 |
| 5,952,741 A | * | 9/1999 | Toy ........................ 307/326 |

(Continued)

FOREIGN PATENT DOCUMENTS

JP    10-135681    5/1998

(Continued)

OTHER PUBLICATIONS

Notice of Reasons for Rejection for corresponding Japanese Application No. 2003-033618 dated Jan. 19, 2005.

(Continued)

*Primary Examiner*—Paul Ip
(74) *Attorney, Agent, or Firm*—Staas & Halsey LLP

(57) ABSTRACT

A circuit system that includes a sensor circuit for a sensor that detects the state of a motor is provided in an inverter unit for driving the motor. A 0V of the circuit system is connected with a shield braid of a shielded cable that connects the sensor circuit and the sensor. Further, the shield braid of the shielded cable is connected to an earth plate.

4 Claims, 1 Drawing Sheet

U.S. PATENT DOCUMENTS

| | | | | |
|---|---|---|---|---|
| 5,990,570 | A | * | 11/1999 | Yoshida et al. ............. 307/10.1 |
| 5,993,680 | A | * | 11/1999 | Sugiyama et al. ............. 216/81 |
| 5,995,348 | A | * | 11/1999 | McCartan et al. ............ 361/42 |
| 6,163,082 | A | * | 12/2000 | Yoshida et al. ............. 307/10.1 |
| 6,176,308 | B1 | * | 1/2001 | Pearson ..................... 166/65.1 |
| 6,294,845 | B1 | * | 9/2001 | Yoshida et al. ............. 307/10.6 |
| 6,525,504 | B1 | * | 2/2003 | Nygren et al. .............. 318/700 |
| 6,534,883 | B2 | * | 3/2003 | Yoshida et al. ............. 307/10.1 |
| 6,652,331 | B2 | * | 11/2003 | Healey .......................... 440/6 |
| 6,768,315 | B2 | * | 7/2004 | Watanabe et al. ........... 324/539 |
| 6,820,437 | B2 | * | 11/2004 | Goto et al. ................... 62/236 |
| 6,870,794 | B2 | * | 3/2005 | Healey ....................... 367/135 |
| 2001/0054847 | A1 | * | 12/2001 | Yoshida et al. ............. 307/10.1 |
| 2002/0013106 | A1 | * | 1/2002 | Healey .......................... 440/6 |
| 2002/0033686 | A1 | * | 3/2002 | Uhl ............................. 318/560 |
| 2002/0153778 | A1 | * | 10/2002 | Oughton, Jr. ................ 307/64 |
| 2002/0171433 | A1 | * | 11/2002 | Watanabe et al. ........... 324/539 |
| 2002/0190042 | A1 | * | 12/2002 | Gadamus et al. ........ 219/130.1 |
| 2003/0080755 | A1 | * | 5/2003 | Kobayashi .................. 324/658 |
| 2003/0143964 | A1 | * | 7/2003 | Otsuka et al. .............. 455/127 |
| 2003/0155874 | A1 | * | 8/2003 | Schierling .................... 318/85 |
| 2003/0203684 | A1 | * | 10/2003 | Healey .......................... 440/6 |
| 2004/0066597 | A1 | * | 4/2004 | Losey ........................ 361/118 |
| 2004/0074255 | A1 | * | 4/2004 | Goto et al. ................... 62/498 |
| 2004/0116084 | A1 | * | 6/2004 | Ward et al. ................. 455/130 |
| 2004/0135589 | A1 | * | 7/2004 | Matuschek et al. ......... 324/691 |
| 2005/0141208 | A1 | * | 6/2005 | Niinuma ..................... 361/797 |
| 2006/0037701 | A1 | * | 2/2006 | Koshiishi et al. ...... 156/345.44 |
| 2006/0037703 | A1 | * | 2/2006 | Koshiishi et al. ...... 156/345.47 |

FOREIGN PATENT DOCUMENTS

| | | |
|---|---|---|
| JP | 2000-195685 | 7/2000 |
| JP | 2001-286152 | 10/2001 |
| JP | 2002-281765 | 9/2002 |

OTHER PUBLICATIONS

Bentley, et al., "Evaluation of Motor Power Cables For PWM AC Drives", IEEE, vol. Conf. 42, pp. 55-69, Jun. 10, 1996.
Patent Abstracts of Japan, vol. 18, No. 20, Jan. 13, 1994 for Japanese Patent Publication No. 05 258872 published Oct. 8, 1993.
Patent Abstracts of Japan, vol. 1998, No. 14, Dec. 31, 1998 for Japanese Patent Publication No. 10 243657 published Sep. 9, 1998.
Patent Abstracts of Japan, vol. 2003, No. 01, Jan. 14, 2003 for Japanese Patent Publication No. 2002 28 1765 published Sep. 27, 2002.
Patent Abstract of Japan, vol. 2000, No. 6, Sep. 22, 2000 for Japanese Patent Publication No. 2000 090751 published Mar. 31, 2000.
European Search Report dated Feb. 10, 2006 for corresponding European Application No. EP 04 25 0690.

* cited by examiner

INVERTER UNIT GROUNDING METHOD AND INVERTER UNIT

BACKGROUND OF THE INVENTION

1. Field of the Invention

The present invention relates to a grounding method for inverter units for driving motors used as drive sources for machines, such as machine tools, various industrial machines, robots, etc., and to an inverter unit, and a machine using the inverter unit.

2. Description of the Related Art

An inverter unit is used as a drive control circuit for driving a motor that is used as a drive source for machines, such as machine tools, various industrial machines, robots, etc. The inverter unit urges a switching element to turn on or off current to be supplied to each winding of the motor, thereby drivingly controlling the motor. Thereupon, the switching current generates noise that consists mainly of high frequency. This noise influences other control circuits.

In order to restrain the influence of the noise that is generated by the switching current, a shielded cable is used to connect the inverter unit and each winding of the motor. In known configurations (e.g., Japanese Patent Application Laid-Open Nos. 2002-281765 and 2001-286152), a shielded cable is used as a connecting wire that connects an inverter unit and each winding of a motor, one end of the cable being grounded, for example.

The inverter unit is provided with a control circuit for controlling it and control circuits for various sensors for detecting the conditions of the motor that is drivingly controlled by means of the inverter unit. The sensors include ones that are attached to the motor and detect the position and speed of the motor, a sensor for detecting the pole position of a rotor, a sensor for detecting the temperature of the motor, etc.

In some cases, control circuits that include the sensor circuits in the inverter unit and connecting wires that connect the control circuits and the sensors may operate wrongly under the influence of the noise that is generated by the on-off operation of the switching element of the inverter unit. Conventionally, as shown in FIG. 2, therefore, a sensor circuit 2 in an inverter unit 1 and a sensor 3 are connected by means of a shielded cable 4, and a shield braid 5 of the shielded cable 4 is connected to an earth plate 7 that is located outside the inverter unit 1. Thus, the influence of noise upon the signal wire that connects the sensor circuit 2 and the sensor 3 is restrained.

On the other hand, a 0V of a DC circuit system that includes the sensor circuit 2 and the like in the inverter unit 1 is separately connected to an earth plate 8 lest the circuit system 2 be influenced by the noise.

According to an alternative method shown in FIG. 3, a shield braid 5 of a shielded cable 4 that connects a sensor circuit 2 in an inverter unit 1 and a sensor 3 are connected to an earth plate 7. A 0V of a circuit system that includes the sensor circuit 2 and the like in the inverter unit 1 is trained in the inverter unit and connected to an earth wire of the inverter unit.

SUMMARY OF THE INVENTION

An inverter unit grounding method according to the present invention comprises: connecting a 0V of a circuit system including a sensor circuit for a sensor in an inverter unit for driving a motor with a shield braid of a shielded cable connecting the sensor circuit and the sensor; and connecting the shield braid of the shielded cable to an earth plate outside the inverter unit.

Further, an inverter unit according to the invention is a device to which the inverter unit grounding method described above is applicable. More specifically, the inverter unit for driving a motor according to the invention comprises a sensor for detecting the state of the motor or a machine using the inverter unit, and a circuit system including a sensor circuit for the sensor, in which the sensor circuit is connected with the sensor by means of a shielded cable having a shield braid, and the shield braid is connected to a 0V of the circuit system and an earth plate outside the inverter unit.

The sensor of the above inverter may detect the position or speed of the motor, the magnetic pole position of a rotor of the motor, the temperature of the motor, or the acceleration of the motor, and the sensor circuit processes signals from the sensor.

Furthermore, a machine according to the invention uses the inverter unit.

According to the present invention, the influence of noise upon the circuit system including the sensor circuit in the inverter unit can be lessened efficiently and easily.

DETAILED DESCRIPTION OF THE PREFERRED EMBODIMENTS

Figure 1:
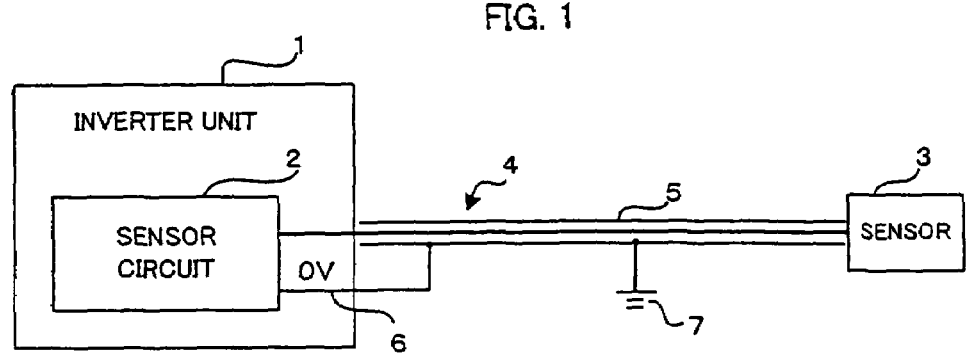
FIG. 1 is a block diagram of showing a principal part according to one embodiment of the present invention.

FIG. 1 is a block diagram showing a principal part according to one embodiment of the present invention. An inverter unit 1 is connected to a winding of each phase of a motor (not shown) and an AC power source. After the AC power source is converted into DC, a switching element is turned on or off to supply current to the winding of each phase of the motor, thereby drivingly controlling the motor.

On the other hand, the motor to be controlled is provided with sensors 3 for detecting its conditions. The sensors 3 include a sensor for detecting the position and speed of the motor, a sensor for detecting the magnetic pole positions of a rotor, a sensor for detecting the temperature of the motor, etc. A shielded cable 4 is used as a connecting wire that connects these sensors 3 and sensor circuits that process sensor signals and the like. The cable 4 serves to reduce influences of noises consisting mainly of high-frequency components that are generated as the switching element of the inverter unit 1 is turned on or off, in particular.

A shield braid 5 of the shielded cable 4 is connected to an earth plate 7 that is located outside the inverter unit 1. Further, a 0V 6 of a DC control circuit system 2 in the inverter unit 1, which includes the sensor circuits and a control circuit for controlling the switching element of the inverter unit, is connected to the shield braid 5 of the cable 4.

The present invention is characterized in that the 0V 6 of the circuit system 2, which includes the sensor circuits in the inverter unit 1, is thus connected to the shield braid 5. This connection lessens the influence of noise upon the circuit system 2, thereby preventing wrong operation.

Since the 0V 6 of the circuit system 2 is connected to the earth plate 7 by means of the shield braid 5 of the shielded cable 4, impedance for high frequency that constitutes the base of the noise lowers. Thus, current that is influenced by the noise quickly flows into the earth plate 7, so that the influence of the noise is lessened.

Figure 2:
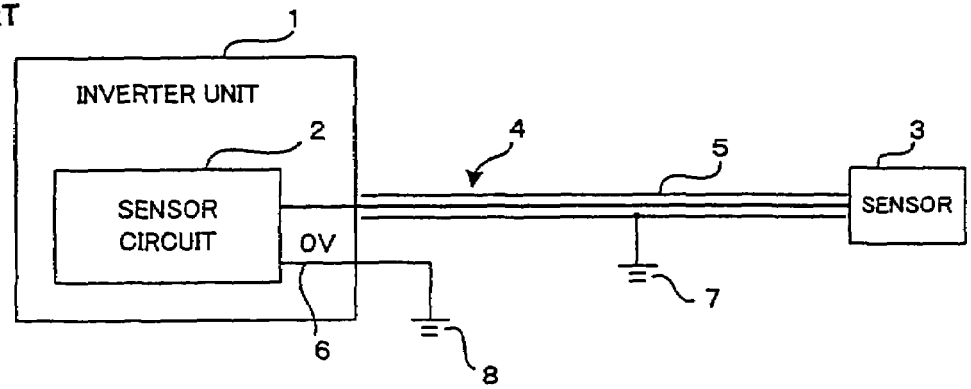
FIG. 2 is a diagram illustrating a prior art grounding method.
Figure 3:
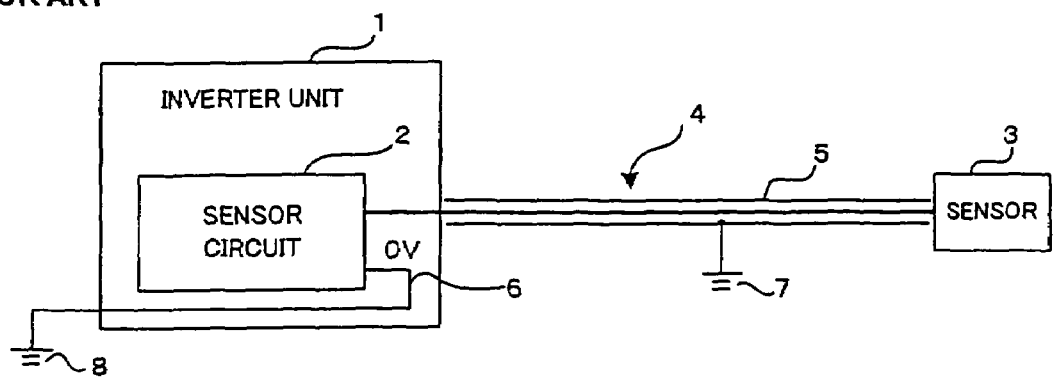
FIG. 3 is a diagram illustrating another prior art grounding method.

Further, the shield braid 5 of the shielded cable 4 that connects the circuit system 2 and the sensors 3 extends close to the circuit system 2 that includes the sensor circuits in the inverter unit 1, so that its connection is simple. Thus, as in the case of the prior art example shown in FIG. 2, the 0V 6 of the control circuit system 2 in the inverter unit 1 need not be connected to the ground by means of a separate wire. As in the case of the prior art example shown in FIG. 3, moreover, the 0V 6 need not be trained in the inverter unit 1. Since the 0V 6 of the circuit system 2 need not be grounded with a separate wire, the manufacturing cost lower. Since the wire 6 need not be trained, furthermore, the degree of freedom of the connection increases, so that the circuit design is easy.

According to the present invention, as described herein, the 0V of the circuit system in the inverter unit can be grounded easily, and the circuits can be connected at low cost with a higher degree of freedom and designed with ease. Further, the resistance to noise can be improved.

What is claimed is:

1. An inverter unit grounding method comprising:
   connecting an inverter unit comprising a sensor circuit to a winding of each phase of a motor and an AC power source;
   converting the AC power source into DC;
   switching a switching element on or off to supply current to the winding of each phase of the motor to thereby drivingly control the motor;
   detecting conditions of the motor with a sensor;
   connecting a shield braid of a shielded cable to the sensor circuit with an earth plate outside the inverter unit to reduce influence components that are generated as the switching element of the inverter unit is turned on or off; and
   connecting a 0V of a circuit system to the earth plate,
   wherein the 0V of the circuit system is connected to the earth plate by the shield braid of the shielded cable, causing impedance for frequency that constitutes the basis of noise upon the circuit system to decrease, thereby lessening influence of the noise upon the system.

2. An inverter unit comprising:
   a sensor circuit connected to a winding of each phase of a motor and an AC power source;
   a converter for converting AC power source into DC;
   a switching element turned on or off to supply current to the winding of each phase of the motor thereby drivingly controlling the motor;
   a circuit system including at least one sensor for detecting a state of the motor; and
   a shield braid of a shielded cable being connected to the sensor circuit with an earth plate outside the inverter unit,
   wherein the shield braid is connected to a 0V of the circuit system and the earth plate outside the inverter unit to reduce influence components that are generated as the switching element of the inverter unit is turned on or off, and
   wherein the 0V of the circuit system is connected to the earth plate by the shield braid of the shielded cable, causing impedance for frequency that constitutes the basis of noise upon the circuit system to decrease, thereby lessening influence of the noise upon the system.

3. The inverter unit according to claim 2, wherein the sensor detects the position or speed of the motor, the magnetic pole position of a rotor of the motor, the temperature of the motor, or the acceleration of the motor, and the sensor circuit processes signals from the sensor.

4. An apparatus comprising:
   means for connecting a 0V of a circuit system, including a sensor circuit in an inverter unit driving a motor;
   a switching element turned on or off to supply current to the motor to thereby drivingly control the motor;
   a circuit system including at least one sensor for detecting a state of the motor;
   a shield braid of a shielded cable being connected to the sensor circuit with an earth plate outside the inverter unit; and
   means for connecting the shield braid of the shielded cable to a 0V of the circuit system and the earth plate outside the inverter unit to reduce an influence of components that are generated as the switching element of the inverter unit is turned on or off, and
   wherein the 0V of the circuit system is connected to the earth plate by the shield braid of the shielded cable, causing impedance for frequency that constitutes the basis of noise upon the circuit system to decrease, thereby lessening influence of the noise upon the system.

* * * * *